3,416,887
METHOD OF MANUFACTURING WET PROCESS
PHOSPHORIC ACID
Asaichi Matsubara, Yoshito Yasutake, Kazunari Ueno, and Shisei Fujita, Yamaguchi-ken, Japan, assignors to Central Glass Co., Ltd., Yamaguchi-ken, Japan
No Drawing. Filed July 7, 1965, Ser. No. 470,233
Claims priority, application Japan, Aug. 5, 1964, 39/44,827; Feb. 2, 1965, 40/5,597
6 Claims. (Cl. 23—122)

ABSTRACT OF THE DISCLOSURE

A method of producing wet process phosphoric acid comprising a first stage wherein phosphate rock is decomposed with sulfuric acid or a mixed acid of sulfuric acid and phosphoric acid and the formed slurry is separated into product phosphoric acid and calcium sulfate dihydrate containing some phosphoric acid, and a second stage wherein the slurry-form calcium sulfate dihydrate, collected and admixed with sulfuric acid or a mixed acid of sulfuric acid and phosphoric acid, is heated in the presence of seed crystals of calcium sulfate hemihydrate to convert said dihydrate to hemihydrate which is then recovered by filtration to obtain calcium sulfate in the form of hemihydrate, while recycling the filtrate to the first stage for use in the decomposition of the phosphate rock.

---

The present invention relates to a method of manufacturing wet process phosphoric acid from phosphate rock. The present invention is characterized by the production of highly concentrated phosphoric acid in high yield and by the recovery of calcium sulfate hemihydrate of high purity as a by-product.

One of the aspects for the present invention lies in the discovery that high quality calcium sulfate hemihydrate is obtained by the steps of adding sulfuric acid of appropriate concentration or a mixture of sulfuric acid and phosphoric acid prepared in specific proportion to the so-called gypsum phosphate which is obtained as a by-product in the manufacture of wet process phosphoric acid, and heating the resultant slurry while maintaining it in slurry form.

According to the present invention, therefore, there is provided a novel method of manufacturing wet process phosphoric acid which, by adroit application of the said discovery to industrial techniques of manufacturing phosphoric acid, makes it practical to obtain highly concentrated phosphoric acid in high yield and to obtain at the same time calcium sulfate hemihydrate of high purity as a by-product.

It is, therefore, one of the objects of the present invention to provide a rationalized method of manufacturing highly concentrated wet process phosphoric acid at a high yield rate.

Another object of the present invention is to produce high quality calcium sulfate which is obtained as by-product in the form of hemihydrate wherein the amount of impurities such as phosphoric acid is extremely small.

Wet process phosphoric acid manufacturing methods may be classified as follows: gypsum mcalcium sulfate anhydrate method, calcium sulfate hemihydrate method and calcium sulfate dihydrate method.

It is known in the manufacture of phosphoric acid (as $P_2O_5$) of high concentration of more than 40% by the anhydrate method or the hemihydrate method that the anhydrate or hemihydrate is stable only in a strictly limited range of temperature close to a boiling point, as is clear from the known range of stability of calcium sulfate in phosphoric acid. It is also known that in phosphoric acid of such high concentration, calcium sulfate hemihydrate is formed in such fine particle size that its slurry is of an extremely high viscosity. This not only makes such operations as stirring and transfer very difficult but also hampers thorough washing with water at the time of filtering, and the result in that the yield rate of phosphoric acid decreases and according the industrial application of said methods is unfeasible.

It is for this reason that the dihydrate method is used industrially. In this process, however, calcium sulfate dihydrate does not deposit unless the temperature is held at a considerably low level as the concentration of phosphoric acid increases, and therefore a large amount of water is required for cooling. Also, as the concentration of phosphoric acid increases, calcium sulfate dihydrate is formed in finer crystals, and as a result, a considerable amount of $P_2O_5$ becomes contained in the crystals, and thus it is difficult to recover $P_2O_5$ by washing the crystals only with water. This means that a large amount of labor is required for the washing to raise the rate of yield of phosphoric acid.

For the reasons described above, in today's manufacturing methods on an industrial basis, the concentration of posphoric acid is usually held below 35%, and in case a higher concentration is desired, an addition process of concentration by evaporation is resorted to. However, neither of these methods is economical.

Even though the concentration of phoshoric acid is maintained at such low level, it is usual that nearly 1% of calcium sulfate dihydrate contains $P_2O_5$ which cannot be recovered by mere washing with water. This constitutes a cause for the markedly low yield rate of phosphoric acid and at the same time greatly effects the grade of calcium sulfate hemihydrate formed as a by-product, and great disadvantage has been experienced in using the by-product for the manufacture of board, plaster and as a filling material in cement.

Various attempts have been made to overcome these problems. For example, Japanese Patent publication No. 15,685/1960 proposes a method of manufacturing phosphoric acid of high concentration. According to the proposed method, the operation must be effected under extremely restricted conditions, and accordingly, the method is not desirable for industrial practice. As for means to reduce the $P_2O_5$ content of calcium sulfate, Japanese Patent publication No. 9,453/1962 proposes the so-called hemihydrate-dihydrate method. By this method, however, the $P_2O_5$ content in the calcium sulfate hemihydrate amounts to approximately 0.3%.

The reason for the past failure to completely eliminate $P_2O_5$ from the produced calcium sulfate dihydrate is because, in the conventional methods of manufacturing wet process phosphoric acid, calcium sulfate which is obtained as a by-product is filtered and washed in the final stage as the dihydrate. Filtering and washing of calcium sulfate in the hemihydrate state may also be conceived. By this latter method, however, it is difficult to convert calcium sulfate into a form which is easy to filter, as discussed previously. In addition, calcium sulfate hemihydrate is unstable at low temperature, and moreover, there is difficulty in that when calcium sulfate is converted into dihydrate, it becomes agglutinated by washing. Until the time of the present invention, it has been technically very difficult to find adequate means of solving these problems. None of the previous attempts have succeeded in finding a solution of the problems for use on an industrial scale.

However, we have discovered a method which is the key to the solution of these problems. We have found that calcium sulfate hemihydrate can be obtained by the following steps. First, phosphoric acid as the final product and calcium sulfate dihydrate containing phosphorus are separated from the slurry of phosphoric acid acid obtained in the conventional wet process which contains calcium sulfate dihydrate. Then, sulfuric acid or a mixed acid of sulfuric acid and phosphoric acid is added to said calcium sulfate dihydrate containing phosphorus, and while maintaining the resultant slurry at a temperature above the point of conversion of calcium sulfate from the dihydrate to the hemihydrate and in the presence of seed crystals, the calcium sulfate is converted into the hemihydrate state, and then this calcium sulfate hemihydrate is filtered. The filtrate of mixed acid is used for decomposing the phosphate rock. We also have found that the $P_2O_5$ content of the calcium sulfate hemihydrate thus produced is in the range 0.02–0.15% though this value may vary with the conditions under which the respective operations are carried out. We have further found that by this method, the $P_2O_5$ content can be reduced to an extremely low level as compared with the values attained by the conventional methods and that, because the crystals of the calcium sulfate hemihydrate are much more coarse and larger than the crystals of calcium sulfate dihydrate obtained by the usual calcium sulfate dihydrate methods, they can be filtered with greater ease. Also, because of the stability of calcium sulfate hemihydrate, it can be washed easily with water at normal temperatures without causing conversion to calcium sulfate dihydrate.

The calcium sulfate hemihydrate thus obtained as a by-product may be immediately dried and pulversized for use in gypsum board, plaster board and the like. Since this hemihydrate converts to the dihydrate by its own moisture, if left to stand for a length of time in the moist state, it can be made into granules or into any shape convenient for subsequent use before the conversion takes place and before the calcium sulfate becomes hardened.

The present invention contemplates the provisions of a method which, by adroit incorporation of the foregoing discovery into actual industrial processes, solves various problems and makes it possible to obtain highly concentrated phosphoric acid with a $P_2O_5$ content in the range of 25 to 55% and at the same time to obtain calcium sulfate hemihydrate as a by-product having great utility.

There will next follow a detailed description of some of the aspects of the present invention.

In a first stage of the method of the present invention, phosphate rock is decomposed by mixed acid, and a slurry of calcium sulfate dihydrate and phosphoric acid is obtained. By suitable separating, such as by clarification, centrifuge-sedimentation or filtering, a predetermined amount of phosphoric acid is separated as a final product. This first stage of the present invention is entirely different from the generally known wet process phosphoric acid manufacturing methods in that there is no need for recovering phosphoric acid from calcium sulfate dihydrate after the phosphoric acid has been seperated as final product. The present invention does not necessarily require that such calcium sulfate dihydrate, which is easy to filter and wash, be prepared. Any decomposing method which is capable of forming calcium sulfate dihydrate which is suitable for the method of separating phosphoric acid herein employed in the present invention may be utilized. It is also possible to use the generally known, wet process phosphoric acid manufacturing methods as such. In order to obtain phosphoric acid with particularly high concentration, however, it is preferred that the following decomposing method be used:

First, phosphate rock is treated with phosphoric acid so that most of the rock dissolves as calcium dihydrogen phosphate. This solution is subjected to further decomposition by a mixed acid of sulfuric acid and phosphoric acid (hereinafter referred to as mixed acid) and as a result, calcium sulfate dihydrate is deposited. From this slurry, a predetermined amount of phosphoric acid is separated. The foregoing is a preferred pattern for the first stage of the process.

Decomposing phosphate rock by first preparing calcium dihydrogen phosphate by treating phosphate rock with phosphoric acid and then causing deposits of crystals by adding sulfuric acid is known. It is also known that in such a two-step decomposing process in the presence of seeds of calcium sulfate dihydrate, crystals of calcium sulfate dihydrate will deposit even in the range in which hemihydrate is easily formed. These facts indicate that highly concentrated phosphoric acid may be manufactured by the calcium sulfate dihydrate method. By this latter method of decomposition, however, crystals of calcium sulfate dihydrate will deposit when the concentration of calcium phosphate is relatively high. As a result, the said method is disadvantageous in that the content of unwashable phosphoric acid in the calcium sulfate dihydrate becomes remarkably higher than that observed in the method where decomposition is effected by a mixed acid. Above all, in the case in which said decomposition method is to be used for the manufacture of highly concentrated phosphoric acid, such tendency toward an increase in phosphoric acid content is even accelerated, and moreover, as is observed generally with other decomposition methods, calcium sulfate dihydrate will deposit in finer crystals as the phosphoric acid concentration increases. This makes it extremely difficult to separate phosphoric acid from calcium sulfate dihydrate by filtration and washing. Although such decomposing methods may allow the manufacture of highly concentrated phosphoric acid by the said calcium sufate dihydrate method, it has been difficult to actually apply them to industrial techniques.

The present invention, however, eliminates the need to thoroughly recover phosphoric acid from calcium sulfate dihydrate which is formed in the first stage as a result of application of the said discoverey to the subsequent second stage, and the present invention has now overcome the difficulties which have been discussed, and has succeeded in providing a really economical method of manufacturing highly concentrated phosphoric acid.

In the second stage, the slurry which consists of the residual calcium sulfate dihydrate and phosphoric acid after a predetermined amount of phosphoric acid has been separated, and which ranges in state between a thick mass and a filter cake depending upon the method of separation adopted, is then mixed with either sulfuric acid or a mixed acid and also with seed crystals of calcium sulfate hemihydrate. The mixture of dihydrate slurry, acid and hemihydrate seed crystals is then heated at an appropriate temperature in order to maintain the slurry mixture at a temperature above the transition temperature (point) at which dihydrate converts to hemihydrate, according to the composition of the mixed acid. After calcium sulfate dihydrate is thus converted into calcium sulfate hemihydrate, the latter is filtered and washed. The procedure of using seed crystals during this process may include: continuous or intermittent supply of raw material into a tank wherein there is contained calcium sulfate hemihydrate which has been previously formed to use this as seed crystals; or a precedingly formed slurry of hemihydrate of calcium sulfate may be mixed with subsequent raw material; or seed crystals of calcium sulfate hemihydrate which are prepared separately may be added. All of these procedures are effective. Both the filtrate collected when calcium sulfate hemihydrate is filtered and the washed liquid may, if desired, be added with sulfuric acid, phosphoric acid, water, etc., and subsequently used for decomposing phosphate ore in the first stage, or if necessary, it may be circulated to the second stage for adjusting the concentration when calcium sulfate dihydrate is converted to hemihydrate of calcium sulfate.

A further, detailed description of the methods of the present invention will be given, particularly in connection with highly concentrated phosphoric acid.

Since phosphate rock is first dissolved in phosphoric acid, there is no particular need to pulverize the rock in advance. However, in order to increase the dissolving velocity and to minimize the capacity of the decomposition tank, it is preferred that the rock be crushed or pulverized so that about 80% of the material rock contain particles that pass a 100 mesh Tyler standard screen. In dissolving phosphate rock in phosphoric acid, a portion of the phosphoric acid separated from the slurry, or the slurry containing calcium sulfate dihydrate is used in circulation.

Next, the liquid is mixed successively with sulfuric acid or a mixed acid in the presence of a large amount of seed crystals of calcium sulfate dihydrate. In doing this, attention is to be paid so that sulfuric acid ion will quickly react with the calcium ion to form calcium sulfate dihydrate and as a result, to continuously keep the value of sulfuric acid ion in the liquid at a low level. When the operation is carried out in this way, for instance, when $P_2O_5$ content is 45% and the temperature is 65° C. which is a temperature obviously beyond the stability limits of dihydrate of calcium sulfate, as is clear from Lehrecke's curve, the calcium sulfate which will deposit under such condition is dihydrate of calcium sulfate. This calcium sulfate dihydrate is stable for a prolonged period of time and therefore, actual operation can be carried out without the fear that said dihydrate of calcium sulfate may be converted to hemihydrate. The adequate amount of sulfuric acid to be used in carrying out the decomposition has to be such that the concentration of the excessive sulfuric acid in the liquid may be less than 3%, and preferably in the range 2–2.5%, as computed in terms of $SO_3$. If the concentration of sulfuric acid is greater than the said limits, the size of the crystals of calcium sulfate dihydrate will increase but their thickness will decrease. On the other hand, if its concentration is lower than that, the thickness of the crystals will increase but the size will decrease. Adequate temperature for decomposition is in the range of about 50 to 70° C. A temperature lower than that will only reduce the velocity of decomposition, but a higher temperature will cause deposits of calcium sulfate hemihydrate. Also, in order to prevent new nuclei from being formed at the preliminary treatment of pulverized ore with phosphoric acid and at the time of decomposition by mixed acid, it is desired to recycle a large amount of dihydrate seed crystals in the decomposition tank.

Calcium sulfate dihydrate obtained by the foregoing method consists of smaller crystals and the content of phosphoric acid in the crystals is greater than that found in crystals of calcium sulfate dihydrate obtained by the usual wet process phosphoric acid manufacturing methods, and therefore, it is difficult to thoroughly recover phosphoric acid which is contained in the crystals by mere filtration and washing. In the present invention, therefore, a desired amount of phosphoric acid is separated by appropriate separating means such as filtration, clarification or centrifuge-sedimentation, from the phosphoric acid slurry containing calcium sulfate dihydrate thus formed, and the remaining calcium sulfate dihydrate containing phosphoric acid is treated in the second stage.

The composition and the concentration of the mixed acid which is used for converting calcium sulfate dihydrate into hemihydrate of calcium sulfate in the second stage is determined so that material balance may be maintained between the first and the second stages. According to the results of experiments, however, the range in which crystals of good hemihydrate is obtained should be very wide, and it was observed that the objectives of the present invention were entirely achieved when various conditions were established in such fashion that the total concentration of acid ($P_2O_5+H_2SO_4$) was 20–60%, $P_2O_5$ 0.5–30%, and $H_2SO_4$ 15–50% after the crystal water of calcium sulfate dihydrate has been discharged into the liquid and after said dihydrate has thereby been converted to hemihydrate. The effects of the concentration of these matters were observed as follows. When the total acid concentration is too low, the temperature of the liquid must be elevated, and this is a disadvantage from the aspect of corrosion of the apparatus, while when the concentration is too high, there is a disadvantage in that the shape of the crystals of hemihydrate is affected. On the other hand, if the $P_2O_5$ content in the mixed acid is extremely low, calcium sulfate anhydrate tends to be formed, whereas if it is too high, the $P_2O_5$ content of calcium sulfate hemihydrate increases and results in a decrease in phosphoric acid yield and also in a reduced quality of the by-product (calcium sulfate). The results of the experiments show that in the said range of concentration, the growth of hemihydrate becomes much more rapid as the temperature rises beyond the point of conversion of calcium sulfate from dihydrate to hemidrate state and as a result, the rapid growth of hemihydrate overcomes the formation and the growth of nuclei of anhydrate, and in fact, hemihydrate slurry containing virtually no anhydrate is obtained.

Also, it is necessary to quickly mix and disperse calcium sulfate dihydrate in the slurry of hemihydrate while maintaining the hemihydrate slurry in the conversion tank relatively highly concentrated. In this manner, large and coarse crystals of hemihydrate of calcium sulfate with a reduced phosphoric acid content are obtained which are easy to filter and wash and which are stable for a prolonged period of time and which are slow to convert to dihydrate of calcium sulfate by washing. Accordingly, the water used in washing need only be a small quantity, and thus, highly concentrated phosphoric acid can be manufactured with a high yield rate. Also, the calcium sulfate thus obtained is of a superior quality with minimum phosphoric acid content. The aforementioned seed crystals which, as previously described, should exist at the time of decomposing phosphate rock and at the time of converting calcium sulfate dihydrate to hemihydrate include not only separately prepared crystal nuclei which are added, but also include utilization of preliminarily formed calcium sulfate dihydrate or hemihydrate which is either retained in the tank or used in circulation. The said first stage in the method of the present invention is intended for the manufacture of highly concentrated phosphoric acid, while the second stage may, of course, be used also for the manufacture of phosphoric acid of normal concentration, and in such case, calcium sulfate of superb quality will be obtained, while also the yield rate of phosphoric acid will be very high.

Several examples of the present invention will be hereinafter described.

A calcium sulfate slurry obtained according to a conventional wet process phosphoric acid manufacturing method was filtered out by a small filter, and the resulting calcium sulfate (not washed) was used as a "filter cake" in a manner which will be hereinafter described.

EXAMPLE 1

The filter-cake used was composed of: solid matter (mostly calcium sulfate dihydrate) 72.5%, adhering moisture content 27.5%, and $P_2O_5$ 9.1%. Two converting tanks, each having an effective capacity of 40 liters and an agitator were connected with each other in series so that the slurry overflows and passes from one tank to the other. Slurry of calcium sulfate hemihydrate which had been prepared by converting calcium sulfate dihydrate to hemihydrate according to other manufacturing techniques was introduced into the said first tank as seed crystals, and then the following materials were continuously supplied into this tank at the following rates:

|  | Kg. per hour |
|---|---|
| Filter-cake | 49.4 |
| 57.5% sulfuric acid | 17.5 |
| Washing liquid in total amount (which will be described later) | 14.9 |

The temperature in the tanks was kept within the range of 83 to 85° C. Calcium sulfate dihydrate which was subsequently supplied in succession converted to hemihydrate at the rate of about 90% in the first tank, and about 100% in the second tank. The fine seed crystals which were initially used, gradually developed, and within six hours they had grown into large, coarse globular crystals with diameters ranging between 200–230μ. Subsequently, it was confirmed that the state of the crystals was stable and lasted for an indefinite length of time. The slurry which had completed conversion and which overflowed from the second tank was stored temporarily in a third tank, and then the slurry was filtered. The cake was washed with water. The filtrate and the wash water were collected separately. In this case filtering and washing were accomplished very easily. The hemihydrate of calcium sulfate after being washed was also stable, and the phenomenon of hydration and solidification was observed to occur in one hour. After the system had reached a steady operating state, the concentration of the slurry in the converting tanks was noted to be 35.3%. The amount of the filtrate, washing liquid and separated hemihydrate-cake obtained per hour and their analysis are as follows:

|  | Filtrate | Washing liquid | Separated hemihydrate cake |
|---|---|---|---|
| Quantity (kg.) | 47.2 | 14.9 | 35.6 |
| Adhering water, percent |  |  | 14.8 |
| $P_2O_5$, percent | 9.5 | 5.1 | 0.05 |
| $H_2SO_4$, percent | 22.1 | 12.0 |  |
| $H_2SO_4$ (kg.) | 10.4 |  |  |

On the other hand, the quantity of phosphoric acid obtained by the usual wet process phosphoric acid manufacturing methods which corresponded to 49.4 kg. of unwashed calcium sulfate dihydrate was 8.1 kg. in terms of $P_2O_5$, and the quantity of $H_2SO_4$ required in obtaining the said dihydrate was 20.5 kg. However, since the quantity of $H_2SO_4$ contained in said filtrate in the above table is 10.4 kg., if the difference of 10.1 kg. of $H_2SO_4$ together with the required amount of water were supplied for decomposing phosphate rock, then the material balance including these matters supplied will be maintained. Moreover, the loss of $P_2O_5$ which is carried out by discharged calcium sulfate will be 35.6 kg.×0.05%=0.018 kg., and the yield rate of phosphoric acid will be 99.8%.

EXAMPLE 2

346 kg. of pulverized phosphate rock ($P_2O_5$ 35.1%) was gradually added to 1465 kg. of mixed acid ($H_2SO_4$ 22.0%, $P_2O_5$ 18.4%) while the produced slurry was being stirred. Air was introduced to cool the slurry and the temperature was maintained between 65 and 70° C. The slurry of calcium sulfate dihydrate obtained by stirring continuously for 4 hours was left to settle and condense. The thus condensed slurry and supernatant of phosphate acid were obtained as follows:

|  | Supernatant liquid | Slurry |
|---|---|---|
| Quantity (kg.) | 606 | 1,180 |
| $P_2O_5$ concentration, percent | 31.3 | ¹46 |
| $SO_3$ content, percent | 1.6 |  |

¹ Solid matter.

The calcium sulfate dihydrate formed at this time consists of very fine crystals and their filtrability was poor. After repeated decantation washing with saturated water of calcium sulfate, the value of residual $P_2O_5$ was 1.76%. To an apparatus similar to that described in Example 1, this calcium sulfate slurry was supplied successively at the rate of 45.2 kg. per hour, and mixed acid ($H_2SO_4$ 68.4% and $P_2O_5$ 6.3%) was supplied at the rate of 20.0 kg. per hour. The temperature was held in the range of 65 to 68° C. At the time the operation was begun, no hemihydrate seed crystals were added. Instead, the calcium sulfate hemihydrate formed during the initial period of operation was used as seed crystals for the subsequent stages. The said calcium sulfate hemihydrate formed during the initial period of operation consisted of very fine crystals. Thereafter, by a procedure similar to that in Example 1, the crystals grew into large, coarse crystals of hemihydrate of calcium sulfate in 10 hours. The liquid phase composition of the slurry after said conversion to hemihydrate of calcium sulfate and the quality of the calcium sulfate hemihydrate after washing with water are as follows:

|  | Liquid phase composition | Calcium sulfate hemihydrate |
|---|---|---|
| $P_2O_5$, percent | 18.0 | 0.09 |
| $H_2SO_4$, percent | 28.6 |  |
| Adhering water, percent |  | 16.6 |

The quantity of calcium sulfate hemihydrate obtained (not dried) was 20.5 kg. per hour, and the composition of the secondary mixed acid consisting of wash liquid and filtrate was: $H_2SO_4$ 25.5% and $P_2O_5$ 16.0%. The amount of the secondary mixed acid in this case was 55.5 kg. as computed from the material balance of $H_2SO_4$.

Now, the material balance of the total system will be considered. The mixed acid to be used for improving the quality of calcium sulfate may be prepared by mixing 8.0 kg. of said secondary mixed acid with 12.0 kg. of concentrated sulfuric acid (98%) per hour. The remaining 47.5 kg. of said secondary mixed acid with 12.0 kg. of concen- and 12.1 kg. of $H_2SO_4$. However, since these values do not exceed 10.3 kg. for $P_2O_5$ and 12.3 kg for $H_2SO_4$ contained in 56.1 kg. of mixed acid $$\left(1465 \text{ kg.} + \frac{45.2}{1180}\right)$$

which was needed for preparing 45.2 kg. of calcium sulfate dihydrate slurry which had been previously supplied for the purpose of converting the state of the calcium sulfate, it is possible to reproduce mixed acid to be used for decomposing phosphate rock by additional supply of this deficient amount of concentrated sulfuric acid and a part of the product phosphoric acid which had been previously separated. Thus, a material balance was established in the system, and as a whole, the yield was high.

EXAMPLE 3

To a first tank with a capacity of 1 m.³ (rubber-lined and having an agitator) the following materials were supplied to decompose phosphate rock:

Kg. per hour
Pulverized phosphate rock ($P_2O_5$ 34.9%) _____ 272
Phosphoric acid for circulation ($P_2O_5$ 44.0%) ____ 436
Slurry for circulation (calcium sulfate dihydrate content: 31%) _____ 4000

Then, the overflow was received in a second tank with a capacity of 3 m.³ and the temperature was held at 65° C. by introducing air while supplying:

Kg. per hour
Concentrated sulfuric acid (98%) _____ 102.7
Mixed acid ($P_2O_5$ 21.0%, $H_2SO_4$ 24.7%) ____ 583

Thus, deposits of calcium sulfate dihydrate crystals were induced. The amount of free sulfuric acid contained in the supernatant fluid of the slurry was maintained at 2.3%. Then, the overflow was received in a third tank with a capacity of 2 m.³. By thoroughly maturing the slurry in the third tank, decomposition of phosphate rock and crystallization of calcium sulfate dihydrate crystals were completed. A part of the slurry was returned to the said first tank as the slurry for circulation, and the remainder was filtered. Highly concentrated phosphoric acid with $P_2O_5$ content of 44.0% was obtained as filtrate at the rate of 650 kg. per hour. A part of this filtrate was removed at the rate of 214 kg. per hour as product phosphoric acid, and the remainder was fed back to the first tank at the rate of 436 kg. per hour as phosphoric acid for circulation. The separated calcium sulfate dihydrate which is not washed is then fed to the next conversion, or the second stage. The converting process was conducted in two rubber-lined tanks each having a capacity of 0.6 m.$^3$ and an agitator. Into the first tank of the conversion or the second stage was supplied:

| | Kg. per hour |
|---|---|
| Said unwashed calcium sulfate dihydrate in entire amount | 692 |
| Concentrated sulfuric acid (98%) | 140 |
| Mixed acid for circulation ($H_2SO_4$ 12.1%, $P_2O_5$ 10.6%) | 200 |

While thoroughly stirring the mixture to quickly mix and disperse calcium sulfate dihydrate in the slurry, the temperature was maintained at 70° C., and thereby calcium sulfate dihydrate was converted to calcium sulfate hemihydrate. The slurry which had undergone partial conversion in the first tank and which was completely converted into hemihydrate of calcium sulfate in the second tank was received in the slurry tank of the second stage and then it was filtered and washed. Washing was conducted by a two-step counter current method. Mixed acid ($H_2SO_4$ 24.7%, $P_2O_5$ 21.0%) was obtained as initial filtrate at the rate of 583 kg. per hour. This filtrate was returned to the second tank used in the previously described phosphoric acid manufacturing process. Wash water was used at the rate of 262 liters per hours, and mixed acid ($P_2O_5$ 10.6%, $H_2SO_4$ 12.1%) was obtained as a secondary filtrate at the rate of 200 kg. per hour. This secondary filtrate was circulated to the first tank mentioned in the previous process for converting the crystal state of the calcium sulfate. Washed calcium sulfate hemihydrate was obtained at the rate of 416 kg. per hour. This may be used without further treatment, but in this example, a small amount of alkaline substance was added to the washed calcium sulfate hemihydrate to neutralize the very small amount of acid that was attached therewith. After this was done, calcium sulfate hemihydrate was introduced into a cylindrical granulator. While adding a small amount of calcium sulfate dihydrate as nuclei, and while granulating it by rotating the granulator, calcium sulfate hemihydrate was again converted to calcium sulfate dihydrate and the latter solidificated. The obtained calcium sulfate dihydrate was of such excellent quality as will be described below, and was quite suitable for the retarder of cement and for other uses. T—$P_2O_5$ 0.07%, F 0.03%, $SO_3$ 45.1% (base of calcium sulfate dihydrate). Phosphoric acid was obtained at a yield rate of 99.2%.

EXAMPLE 4

To an agitating tank (first reaction tank) with a capacity of 2 m.$^3$, the following were supplied successively:

| | kg. per min. |
|---|---|
| Pulverized phosphate rock, kg. per min. | 20 |
| Calcium sulfate dihydrate slurry for circulation (slurry concentration: 28%), l. per min. | 130 |
| Phosphoric acid for circulation ($P_2O_5$ 47.1%), l. per min. | 30.8 |

While the mixture was being stirred, the temperature was maintained in the range of 60 to 65° C. and the rock was decomposed. The slurry overflowed from the first reaction tank to the second reaction tank of stainless steel with a capacity of 7.5 m.$^3$, into which the following materials were supplied successively:

| | L. per min. |
|---|---|
| Concentrated sulfuric acid (98%) | 4.81 |
| Mixed acid ($H_2SO_4$ 23.5%, $P_2O_5$ 22.5%) | 27.2 |
| Slurry for circulation | 130 |

While the mixture was being agitated, the temperature was held at 60° C., and calcium sulfate dihydrate was formed. The free sulfuric acid in the liquid phase of the slurry was maintained at about 1.8% as $SO_3$. This calcium sulfate dihydrate slurry was further subjected to maturation at 60° C. in a third tank for crystal growth having a capacity of 7.5 m.$^3$. After the dihydrate crystals were thus left to make substantial growth and become mature, a part of this slurry was fed back to both tanks for recycle slurry, and the remainder was filtered with a suction filter. High concentration phosphoric acid ($P_2O_5$ concentration 47.1%) was obtained as a filtrate. A part of this filtrate, namely, 14.8 kg. per minute was separated as product, and the remainder was fed back to the first tank (2 m.$^3$) as recycle acid. The dihydrate of calcium sulfate was filtered by sucking as much as possible without subjecting it to washing. Then the calcium sulfate dihydrate was treated as follows:

Into the first tank of the three tanks having an overflow pipe provided at the evel of 1.6 m.$^3$ arranged in such fashion that the liquid overflowed from the first tank into the next, the following materials were successively introduced:

| | |
|---|---|
| Said unwashed calcium sulfate dihydrate, in total amount, kg./min. | 49.7 |
| Concentrated sulfuric acid, l. per min. | 4.90 |
| Mixed acid for circulation ($H_2SO_4$ 12.2%, $P_2O_5$ 11.7%), l. per min. | 11.1 |

The mixture was stirred to such an extent that the filter-cake, sulfuric acid and mixed acid quickly mixed and dispersed in the slurry while the temperature was held at 65 to 70° C., and thus calcium sulfate dihydrate was converted to calcium sulfate hemihydrate. Following partial conversion in the first tank, the slurry almost completely converted in the second tank. The slurry of calcium sulfate hemihydrate which had grown into coarse, large crystals was stored in the third tank, and then it was filtered by a suction filter. Initial filtrate ($H_2SO_4$ 23.5%, $P_2O_5$ 22.5%) was circulated to the second (7.5 m.$^3$) tank of the previous phosphoric acid manufacturing process. Next, 450 cc. of water per 1 kg. of solid filter-cake was sprayed on the cake to wash it. Thus, secondary filtrate comprising $H_2SO_4$ 12.2%, $P_2O_5$ 11.7% was obtained. This secondary filtrate was fed back as the mixed acid for circulation to the first tank of the apparatus for converting the state of the calcium sulfate. The filter-cake of calcium sulfate hemihydrate having adhering water due to said washing was left to stand and said filter-cake was converted to dihydrate cake by the action of said adhering water. This analysis being: T—$P_2O_5$ 0.09%, F 0.04%, $SO_3$ 45.3%. The yield of phosphoric acid showed a high rate, namely, 99.6%.

Numerous modifications and variations of the disclosed processes will now become apparent to those skilled in the art without departing from the scope and spirit of the invention as defined in the appended claims.

What is claimed is:

1. A method of manufacturing wet process phosphoric acid, said method comprising a first stage of forming a phosphoric acid slurry containing calcium sulfate dihydrate from a phosphate rock by decomposing phosphate rock with an acid selected from the group consisting of sulfuric acid and a mixed acid of sulfuric acid and phosphoric acid and separating the thusly formed phosphoric acid slurry into phosphoric acid having a $P_2O_5$ concentration in the range of 25% to 55% and calcium sulfate dihydrate containing phosphoric acid adhering thereto; and a second stage of adding an acid selected from the group consisting of sulfuric acid and a mixed acid of sulfuric acid and phosphoric acid to said calcium sulfate dihydrate containing phosphoric acid and subjecting said calcium sulfate dihydrate to heating in the presence of seed crystals of calcium sulfate hemihydrate to thereby convert said calcium sulfate dihydrate to calcium sulfate hemihydrate; the acid concentration and composition being such that all of the following conditions are satisfied when the calcium sulfate dihydrate is converted to calcium sulfate hemihydrate:

(a) the total concentration of acid ($P_2O_5+H_2SO_4$) is in the range of 20% to 60%;
(b) the $P_2O_5$ concentration is in the range of 0.5% to 30%; and
(c) the $H_2SO_4$ concentration is in the range of 15% to 50%;

filtering the formed crystals of calcium sulfate hemihydrate, washing the thusly filtered crystals with water to recover highly pure calcium sulfate hemihydrate and recycling the filtrate for use in the decomposition of phosphate rock with said mixed acid in said first stage.

2. A method according to claim 1, wherein a portion of the calcium sulfate hemihydrate recovered in the second stage is recycled for use as the seed crystals to be added in the second stage.

3. A method according to claim 1, wherein a portion of the filtrate recovered in the second stage and containing phosphoric acid and sulfuric acid is recycled for use in regulating the acid concentrations when the calcium sulfate dihydrate is converted to calcium sulfate hemihydrate in the second stage.

4. A method for manufacturing wet process phosphoric acid, said method comprising a first stage of adding phosphoric acid to a phosphate rock to dissolve a major portion of the phosphate rock and form a solution of calcium dihydrogen phoshate adding to the resulting solution an acid selected from the group consisting of sulfuric acid and phosphoric acid and seed crystals of calcium sulfate dihydrate to thereby form a phosphoric acid slurry containing calcium sulfate dihydrate and separating said phosphoric acid slurry into phosphoric acid having a $P_2O_5$ concentration in the range of 25% to 55% and calcium sulfate dihydrate containing phosphoric acid adhering thereto; and a second stage of adding an acid selected from the group consisting of sulfuric acid and a mixed acid of sulfuric acid and phosphoric acid to the thusly separated calcium sulfate dihydrate containing phosphoric acid adhering thereto and subjecting said calcium sulfate dihydrate to heating in the presence of seed crystals of calcium sulfate hemihydrate to thereby convert the calcium sulfate dihydrate to calcium sulfate hemihydrate, the acid concentration and composition being such that all of the following conditions are satisfied when the calcium sulfate dihydrate is converted to calcium sulfate hemihydrate:

(a) the total concentration of acid ($P_2O_5+H_2SO_4$) is in the range of 20% to 60%;
(b) the $P_2O_5$ concentration is in the range of 0.5% to 30%; and
(c) the $H_2SO_4$ concentration is in the range of 15% to 50%;

filtering the formed crystals of calcium sulfate hemihydrate, washing the filtered crystals with water to recover highly pure calcium sulfate hemihydrate and recycling the filtrate for use in the decomposition of phosphate rock with said mixed acid in said first stage.

5. A method according to claim 4, wherein sulfuric acid is added to the solution of calcium dihydrogen phosphate in an amount such that after calcium sulfate dihydrate has been formed, the sulfuric acid is present in an excess of at most 3% based on $SO_3$.

6. A method according to claim 4, wherein the phosphate rock is dissolved at a temperature in the range of 50° C. to 70° C.

References Cited

UNITED STATES PATENTS 1,916,431   7/1933   Larsson _____ 23—165

FOREIGN PATENTS 1,350,642   2/1964   France.

OSCAR R. VERTIZ, *Primary Examiner.*

ARTHUR J. GREIF, *Assistant Examiner.*

U.S. Cl. X.R.

23—165